US010942559B2

(12) United States Patent
Holland et al.

(10) Patent No.: US 10,942,559 B2
(45) Date of Patent: Mar. 9, 2021

(54) ELECTRONIC DISPLAY POWER MANAGEMENT SYSTEMS AND METHODS

(71) Applicant: Apple Inc., Cupertino, CA (US)

(72) Inventors: Peter F. Holland, Los Gatos, CA (US); Brad W. Simeral, San Francisco, CA (US); Lior Zimet, Kerem Maharal (IL)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/123,848

(22) Filed: Sep. 6, 2018

(65) Prior Publication Data

US 2020/0081517 A1 Mar. 12, 2020

(51) Int. Cl.
*G06F 1/3234* (2019.01)
*G06F 1/3293* (2019.01)
*G06F 1/329* (2019.01)

(52) U.S. Cl.
CPC ............ *G06F 1/3265* (2013.01); *G06F 1/329* (2013.01); *G06F 1/3293* (2013.01); *G09G 2330/021* (2013.01)

(58) Field of Classification Search
None
See application file for complete search history.

(56) References Cited

U.S. PATENT DOCUMENTS

| 8,766,919 | B1* | 7/2014 | Lachwani | G09G 5/00 345/168 |
|---|---|---|---|---|
| 2007/0006080 | A1* | 1/2007 | Finger | G11B 27/005 715/719 |
| 2011/0078536 | A1 | 3/2011 | Han et al. | |
| 2014/0191981 | A1 | 7/2014 | Ramasarma et al. | |
| 2014/0198016 | A1 | 7/2014 | Hunt et al. | |
| 2016/0189638 | A1* | 6/2016 | de Greef | G09G 3/348 345/691 |
| 2016/0260408 | A1* | 9/2016 | Chen | G06F 3/1446 |
| 2017/0053592 | A1 | 2/2017 | Shin et al. | |
| 2017/0092236 | A1* | 3/2017 | Tripathi | G09G 5/395 |
| 2019/0109920 | A1* | 4/2019 | Li | G06F 16/9574 |

* cited by examiner

*Primary Examiner* — Joni Hsu
(74) *Attorney, Agent, or Firm* — Fletcher Yoder PC

(57) ABSTRACT

An electronic device may include a display panel to display images based on corresponding image data and an image source to pre-render a flip-book including a first image frame for display at a first target presentation time and a second image frame for display at a second target presentation time. The electronic device may also include a display pipeline coupled between the display panel and the image source having image data processing circuitry to process image data for display. The electronic device may also include a controller to instruct the display pipeline to process image data, to determine a power-on time based on a target presentation time, and to instruct the display pipeline to power-gate the image data processing circuitry upon completion of the processing of image data and until the power-on time is reached.

20 Claims, 10 Drawing Sheets

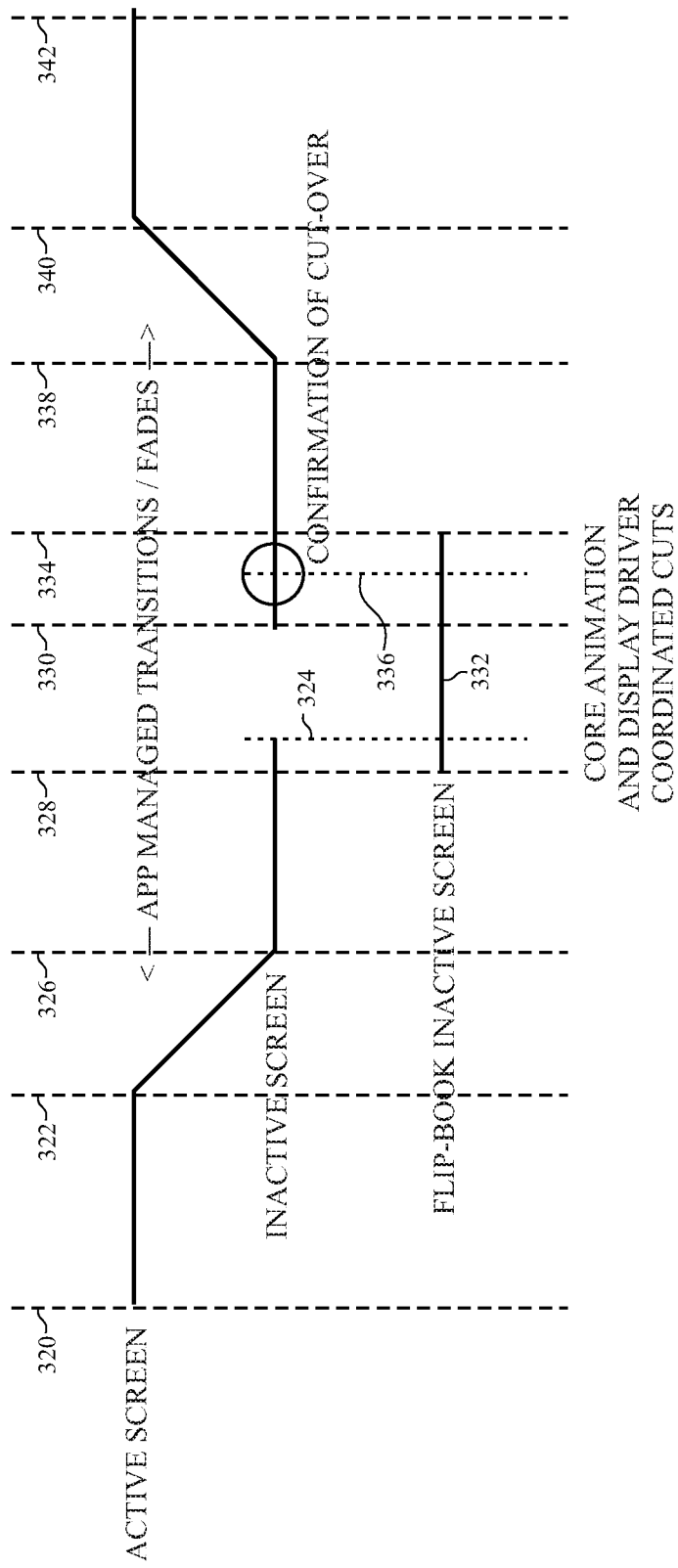

ELECTRONIC DISPLAY POWER MANAGEMENT SYSTEMS AND METHODS

BACKGROUND

The present disclosure relates generally to electronic displays and, more particularly to, power management techniques for image data processing.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. In any case, to display an image, an electronic display may control light emission (e.g., luminance) of its display pixels based at least in part on corresponding image data.

In some instances, while an electronic device is powered-on, its electronic display may have the ability to be selectively powered-on or powered-off. When powered-on, an electronic display may display images. However, an electronic display generally consumes more electrical power when powered-on compared to when it is powered-off. In other words, increasing duration an electronic display is in a powered-on state may facilitate improving information communication via the electronic display, but may also affect power consumption efficiency, for example, in wearable and/or portable electronic devices that store a finite amount of electrical energy.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides techniques that facilitate implementing a decoupled electronic display with improved power consumption efficiency. In some embodiments, an electronic device may include a display pipeline that processes image data before the image data is used to display corresponding image frames on its electronic display, for example, to facilitate improving perceived image quality. Additionally, in some embodiments, image frames may be rendered and stored in memory accessible to the display pipeline, for example, by a processor of the electronic device.

To facilitate reducing power consumption, in some embodiments, image frames may be pre-rendered to enable the display pipeline to retrieve and process corresponding image data. In other words, in such embodiments, the display pipeline may continue processing image data to enable the electronic display to display corresponding image frames even while the processor is powered-off (e.g., electrically disconnected from the power supply of the electronic device). In this manner, the electronic device may display images via its electronic display with improved power consumption efficiency.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 13 is a diagrammatic representation generally depicting outputs from an always-on display of the electronic device of FIG. 1 that transitions into and out of a flip-book power-off mode, in accordance with an embodiment.

DETAILED DESCRIPTION OF SPECIFIC EMBODIMENTS

Figure 1:
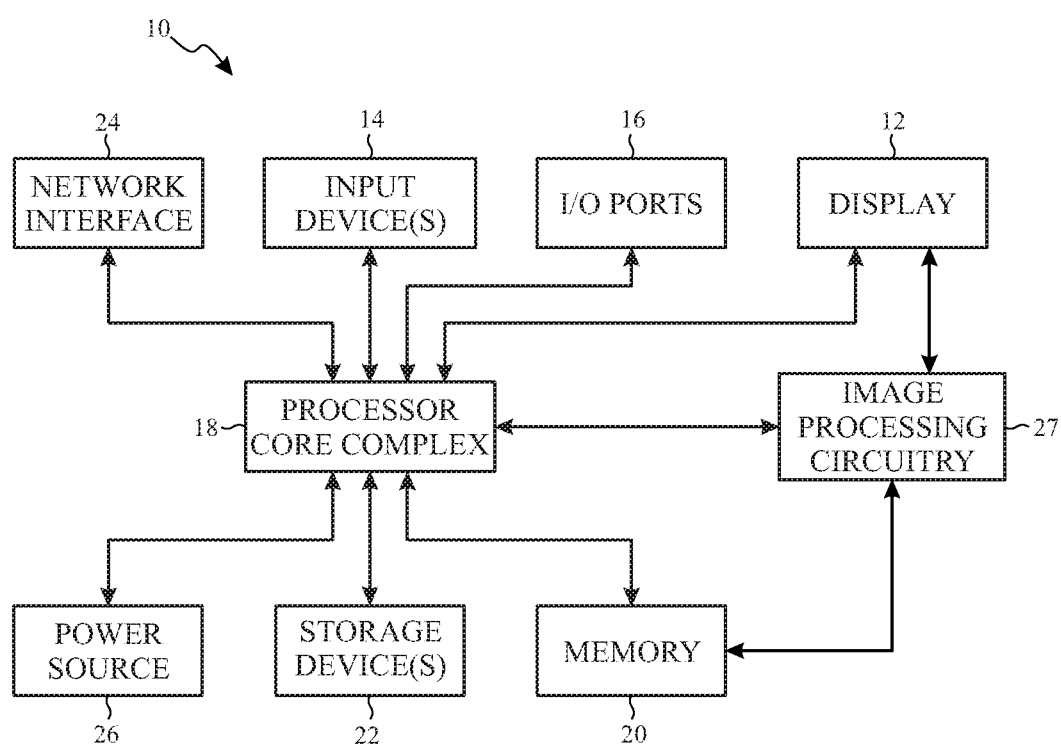
FIG. 1 is a block diagram of an electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may include components that, in operation, consume (e.g., use) electrical power. For example, electronic devices may include a first (e.g., application) processor (e.g., image source) that renders image frames by generating corresponding image data, which may be stored in memory. Additionally, electronic devices may include a display pipeline that retrieves and processes the image data before the image data is used to display the image frame on an electronic display, for example, to facilitate improving perceived image quality of the image frame.

Based at least in part on received image data, the electronic display may control light emission (e.g., luminance) of its display pixels to facilitate information communication by displaying a corresponding image frame. For example, in a liquid crystal display (LCD), electrical energy may be stored in the pixel electrode of a display pixel to produce an electric field between the pixel electrode and a common electrode, which controls orientation of liquid crystals and, thus, light emission from the display pixel. Additionally, in an organic light-emitting diode (OLED) display, electrical energy may be stored in a storage capacitor of a display pixel to control electrical power (e.g., current) supplied to a self-emissive component (e.g., OLED) and, thus, light emission from the display pixel. However, electronic devices, such as wearable or portable electronic devices, often store a finite amount of electrical energy.

Accordingly, the present disclosure provides techniques for implementing a decoupled display that may balance information communication efficiency and power consumption efficiency. In some embodiments, the decoupled display may be operated as an always-on display that continuously displays images while the electronic device is not in operation or powered-off. In other words, the always-on display may nevertheless be powered-on when the electronic device is powered-off. The decoupled display may be functionally separate from processing circuitry of an electronic device, for example, an image source and a display pipeline of an electronic device, such that at least part of the processing circuitry may be operated to enter a lower power-consuming state to decrease power consumption of the electronic device without affecting the power consumption of the decoupled display. To facilitate reducing power consumption, the image source of the electronic display may pre-render image frames each to be displayed at a pre-determined point in time and store corresponding image data in memory accessible by the display pipeline, for example, as a flip-book. In this manner, the display pipeline may implement autonomous frame duration, in which the display pipeline automatically retrieves and processes image data corresponding to a pre-rendered image frame for display at its pre-determined point in time.

To facilitate implementing autonomous frame duration, in addition to pre-rendering the image frames, the image source may generate pipeline configurations (e.g., register values or configuration data) corresponding with each pre-rendered image frame, which may be stored in memory accessible to the display pipeline. Additionally, the image source may generate time stamp queue (TSQ) entries, which each includes a pointer to a corresponding pipeline configuration and a time stamp that indicates when a corresponding pre-rendered image frame is to be displayed. In other words, based on entries stored in its time stamp queue, the display pipeline may determine presentation time and pipeline configurations for image frames corresponding with each of the time stamp queue entries.

In particular, based on the pipeline configuration pointer indicated in a time stamp queue entry, the display pipeline may retrieve corresponding pipeline configurations to be used to process a corresponding image frame into a configuration buffer, for example, implemented as a shadow FIFO. Additionally, based on the time stamps, the display pipeline may determine when the corresponding image frames are to be displayed and, thus, when the display pipeline is to begin configuration and/or processing of the image frames. For example, the display pipeline may pop (e.g., retrieve) an entry from its time stamp queue a configuration duration (e.g., period) and processing duration (e.g., period) before the target presentation time indicated by the entry, program its registers using corresponding pipeline configurations stored in its configuration buffer during the configuration duration, and process corresponding image data during the processing duration. In this manner, power consumption efficiency of an electronic device may be improved, for example, by reducing power consumption by enabling its first (e.g., application) processor to be powered-off while its electronic display continues to display images.

To facilitate further reducing power consumption, in some embodiments, the electronic device may include a second (e.g., always-on) processor that controls power management. For example, the second processor may determine when to power-off, when to power-gate, and when to power-on the display pipeline and/or image data processing circuitry of the display pipeline. In some embodiments, the second processor may determine to power-off and/or power-gate the display pipeline while the display pipeline is idle and/or while a user of the electronic device is not actively interacting with the electronic device. Additionally, when the display pipeline is in a reduced-power state (e.g., powered-off, power-gated), the second processor may determine when to power-on the display pipeline, for example, based at least in part on time stamps indicated in its time stamp queue entries and instruct the electronic device to connect electrical power accordingly. In this manner, power consumption efficiency of an electronic device may be improved, for example, by reducing power consumption through permitting its display pipeline to be temporarily operated in a reduced-power state (e.g., powered-off, power-gated) while still enabling image frames to be displayed at target presentation times.

To help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network.

Additionally, as depicted, the processor core complex 18 is operably coupled to the power source 26. In some embodiments, the power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O port 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by displaying frames based at least in part on corresponding image data. As depicted, the electronic display 12 is operably coupled to the processor core complex 18 and the image processing circuitry 27. In this manner, the electronic display 12 may display frames based at least in part on image data generated by the processor core complex 18, the image processing circuitry 27. Additionally or alternatively, the electronic display 12 may display frames based at least in part on image data received via the network interface 24, an input device, and/or an I/O port 16.

Figure 2:
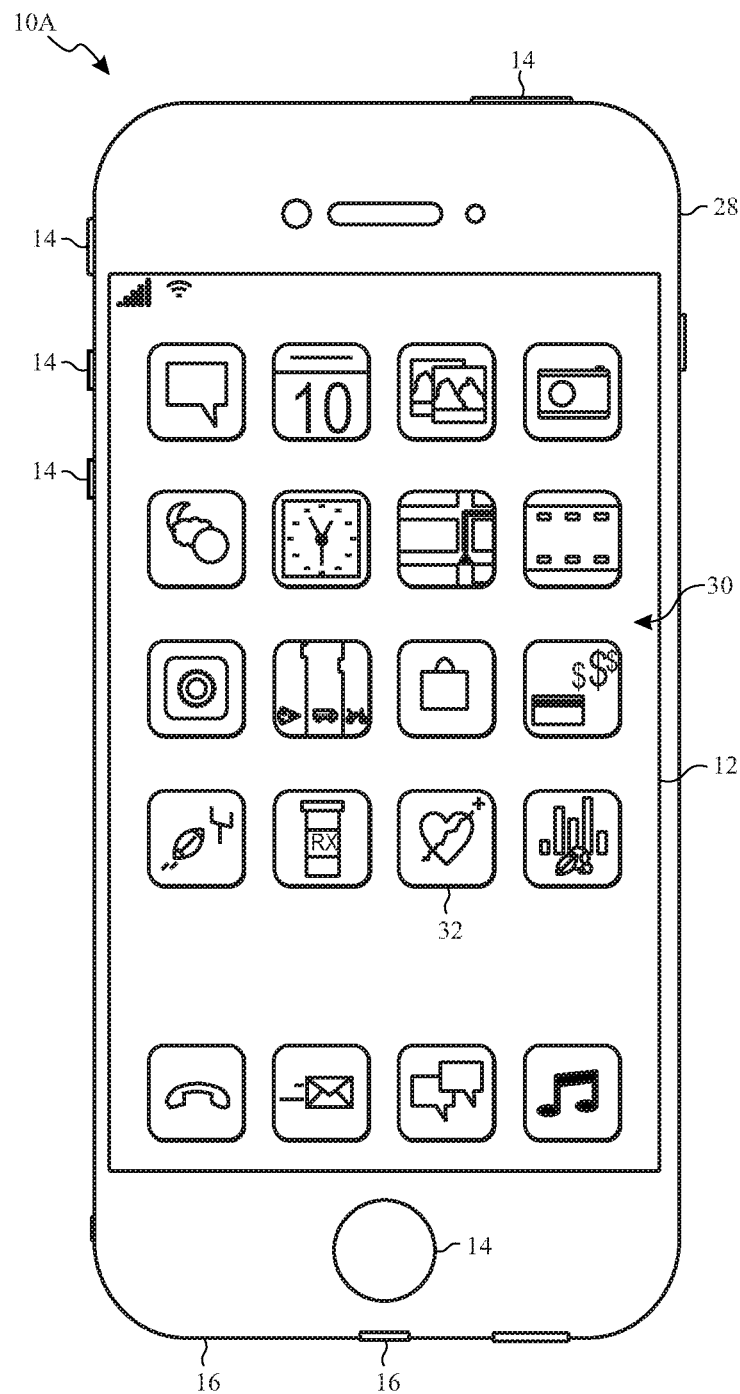
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 may surround the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 may be accessed through openings in the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 28. In some embodiments, the I/O ports 16 may include, for example, an audio jack to connect to external devices.

Figure 3:
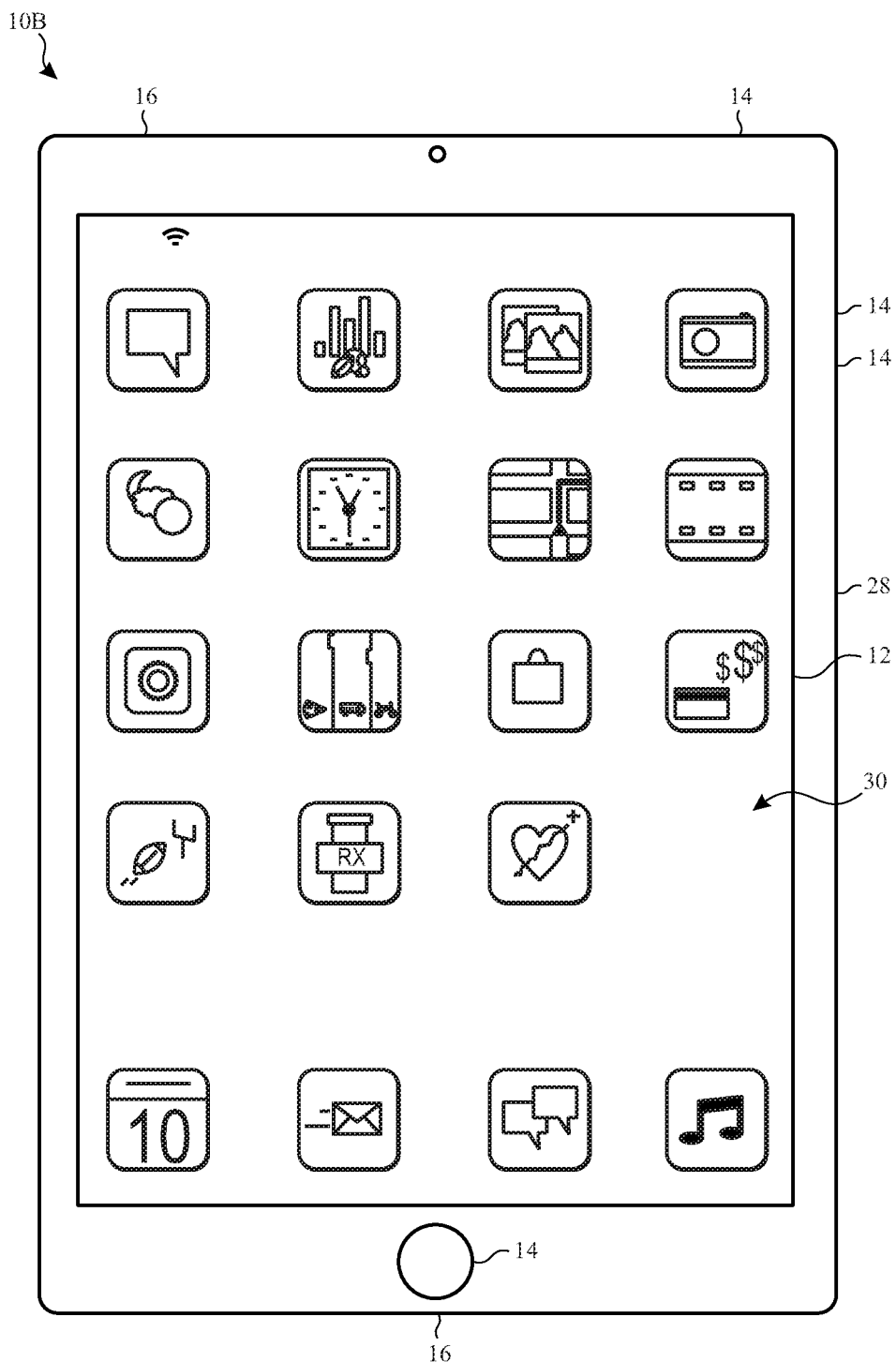
FIG. 3 is another example of the electronic device of FIG. 1, in accordance with an embodiment.
Figure 4:
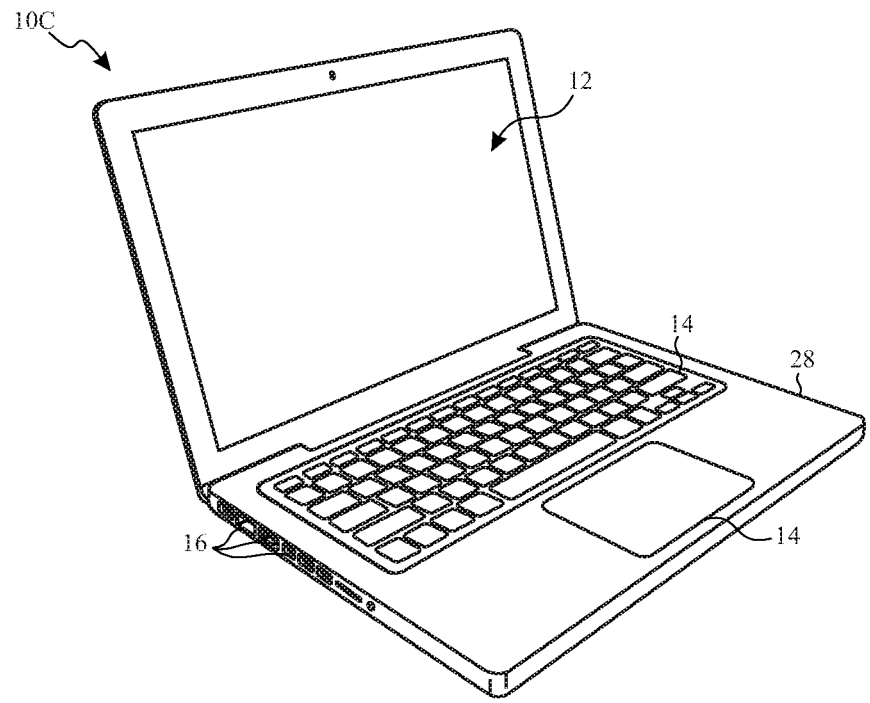
FIG. 4 is another example of the electronic device of FIG. 1, in accordance with an embodiment.
Figure 5:
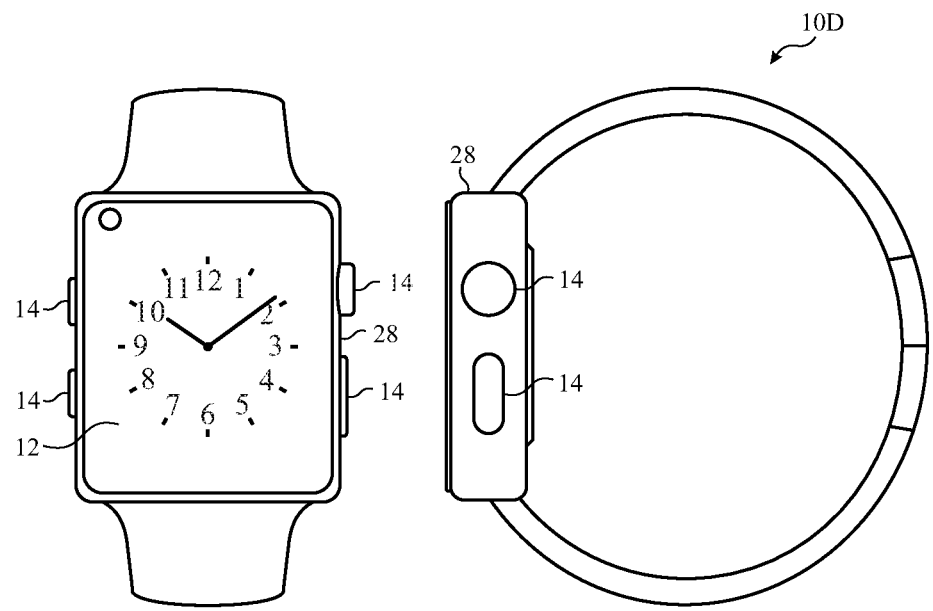
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

In any case, as described above, operating an electronic device 10 to communicate information by displaying images on its electronic display 12 generally consumes electrical power. Additionally, as described above, electronic devices 10 often store a finite amount of electrical energy. Thus, to facilitate improving information communication and power consumption efficiency, an electronic device 10, in some embodiments, may operate electronic display 12 as an always-on display while temporarily power-gating and/or powering-off components, such as a display pipeline that processes image data before the image data is used to display a corresponding image on the electronic display 12.

Figure 6:
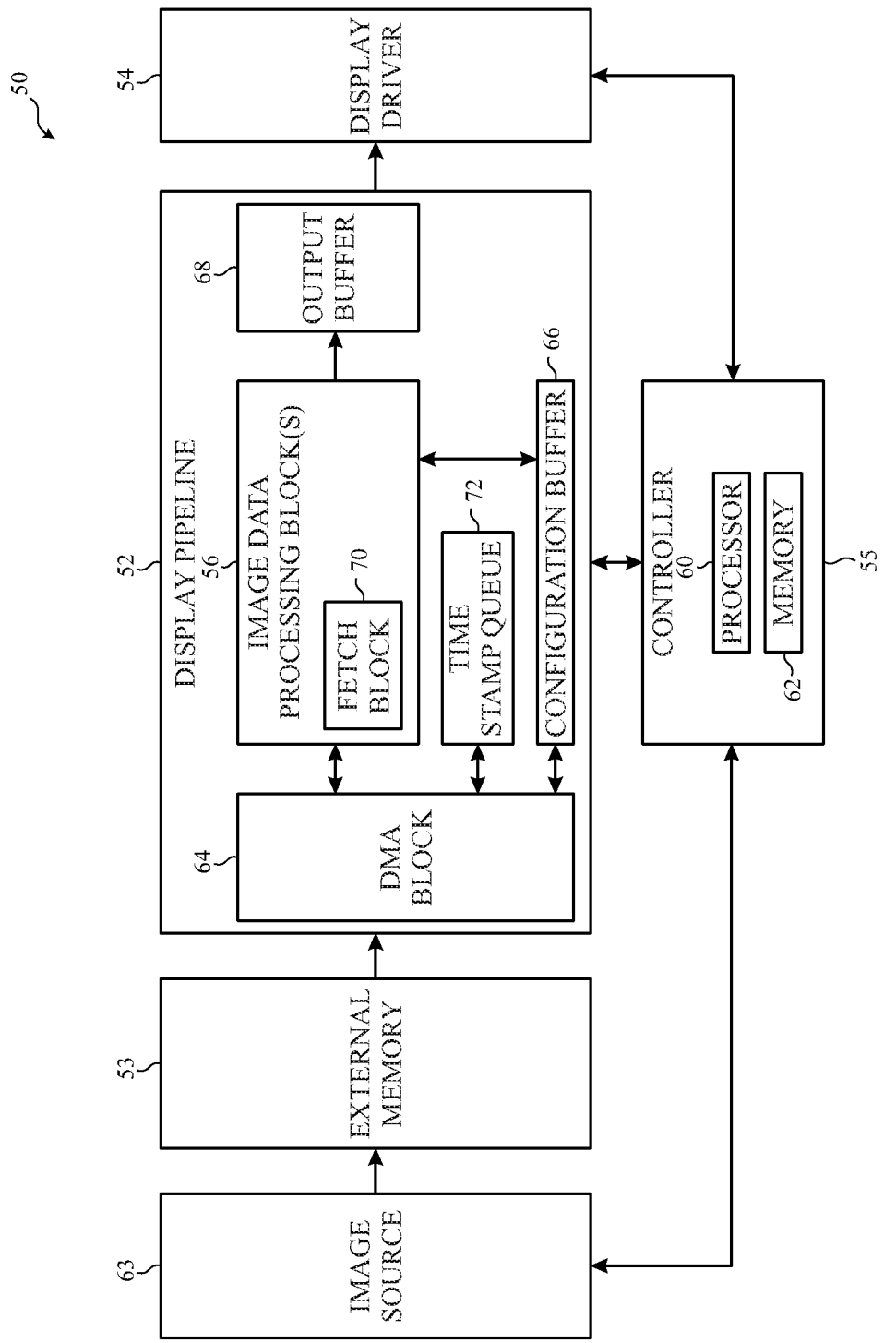
FIG. 6 is a block diagram of a portion of the electronic device of FIG. 1 including an image source and a display pipeline, in accordance with an embodiment.

To help illustrate, an image processing system 50 that includes a display pipeline 52, which may be implemented in an electronic device 10, is shown in FIG. 6. As depicted, the image processing system 50 also includes an image source 63, external memory 53 (e.g., local memory 20), a controller 55, and a display driver 54, which may be implemented in an electronic display 12. In some embodiments, the controller 55 may control operations of the display pipeline 52, the external memory 53, the display driver 54, and/or other portions of the electronic device 10.

To facilitate the controlling operation, the controller 55 may include a controller processor 60 and controller memory 62. In some embodiments, the controller processor 60 may execute instructions stored in the controller memory 62. Thus, in some embodiments, the controller processor 60 may be included in the processor core complex 18, the image processing circuitry 27, a timing controller in the electronic display 12, a separate processing module, or any combination thereof. Additionally, in some embodiments, the controller memory 62 may be included in local memory 20, the main memory storage device 22, external memory 53, internal memory of a display pipeline 52, a separate tangible, non-transitory, computer readable medium, or any combination thereof. Although depicted as a single controller 55, in some embodiments, one or more separate controllers 55 may be implemented to control operation of the electronic device.

In any case, the display pipeline 52 may operate to process image data retrieved (e.g., fetched) from the external memory 53, for example, to facilitate improving perceived image quality through the processing. In some embodiments, the display pipeline 52 may be implemented via circuitry, for example, packaged as a system-on-chip (SoC). Additionally or alternatively, the display pipeline 52 may be included in the processor core complex 18, the image processing circuitry 27, a timing controller (TCON) in the electronic display 12, other one or more processing units, other processing circuitry, or any combination thereof.

In any case, as depicted, the display pipeline 52 may include a direct memory access (DMA) block 64, a configuration buffer 66, an output buffer 68, one or more image data processing blocks 56 including a fetch block 70, and a time stamp queue 72. The display pipeline 52 may operate to retrieve image data from the external memory 53 that an image source 63 generates and stores into the external memory 53, and upon retrieving the image data, the display pipeline 52 may also process the image data prior to transmission to the display driver 54.

As previously described, the image source 63 operates to generate and store image data into the external memory 53 and operates to generate time stamp queue 72 entries that correspond to image data stored in the external memory 53. Upon storing the time stamp queue 72 entries and the image data in memory, the display pipeline 52 operates to retrieve the stored image data and entries in preparation for output.

Figure 7:
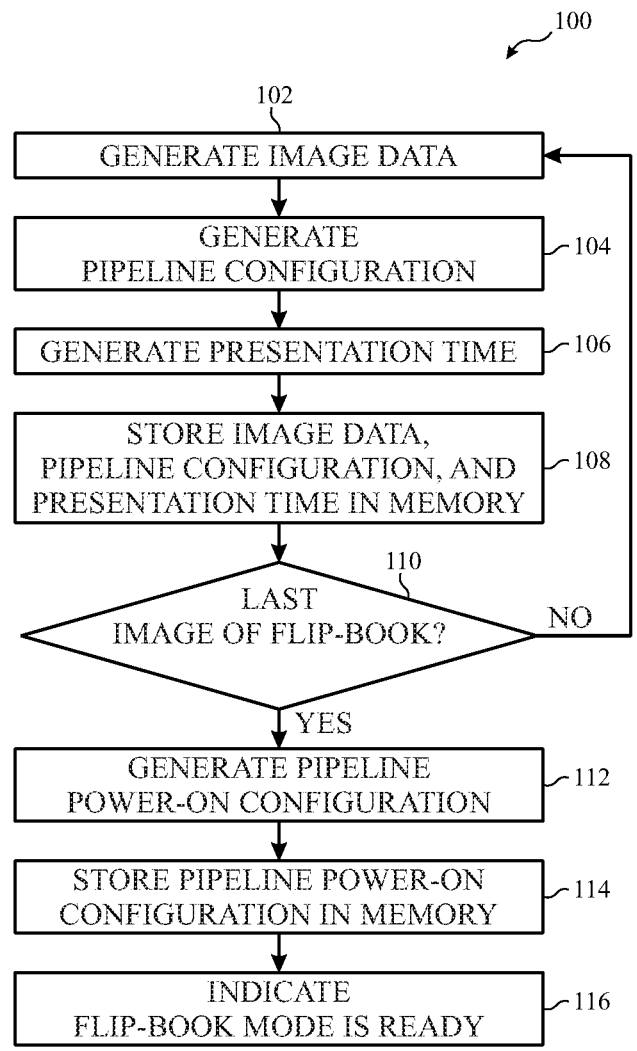
FIG. 7 is a flow diagram of a process for operating the image source of FIG. 6, in accordance with an embodiment.

To help illustrate, an example of a process 100 for controlling operation of an image source 63 coupled to an external memory 53 is described in FIG. 7. Generally, the process 100 includes generating image data (process block 102), generating a pipeline configuration (process block 104), generating a presentation time (process block 106), storing image data, pipeline configuration, and presentation time in memory (process block 108), determining if image is a last image of flip-book (decision block 110). In response to the image not being a last image, the process 100 includes repeating the generation of image data (process block 102) and continuing the process 100. In response to the image being a last image, generating a pipeline power-on configuration (process block 112), storing pipeline power-on configuration in memory (process block 114), and indicating the flip-book mode is ready (process block 116). In some embodiments, the process 100 may be implemented by executing instructions stored in a tangible, non-transitory, computer-readable medium, such as external memory 53, using processing circuitry, such as the image source 63 or the controller 55.

Thus, in some embodiments, the image source 63 may generate image data (process block 102). The image source 63 may prepare a flip-book for future display by generating image data for each respective image frame of the flip-book. As described above, a flip-book may be a set of image frames that are pre-rendered such that rendering has already occurred for all images of the flip-book before displayed a first image of the flip-book. Thus, the image source 63 may generate image data based on image content to be displayed at a future time as part of a flip-book.

The image source 63 may also generate a pipeline configuration to be used to be implemented by a display pipeline 52 while processing the image data (process block 104). In some embodiment, the image source 63 may generate a pipeline configuration corresponding to each image. The pipeline configuration may include one or more settings and/or one or more configurations to be applied to a display pipeline 52 prior to processing the flip-book image data for display. The pipeline configuration may include indications for register values, settings, image processing instructions, and the like, such that upon application of the pipeline configuration to the display pipeline 52, the display pipeline 52 is programmed to correctly process the image data.

After generating the pipeline configuration, the image source 63 may determine a target presentation time for the image (process block 106). The presentation time indicates the time at which the image is to be displayed on an electronic display 12. The image source 63 may determine a presentation time based on stored indications for appropriate presentation times based on image content included in the flip-book. For example, when a flip-book includes images of clock hands moving on a clock, the image source 63 may determine that target presentation time of each successive image in the flip-book is one second after the target presentation time of a directly previous image. Additionally or alternatively, when a flip-book includes screen saver images, the image source 63 may determine that target presentation time of each successive image in the flip-book is five minutes after the target presentation time of a directly previous image.

Upon generating the presentation time, the image source 63 may store the image data, the pipeline configuration, and the presentation time into an external memory 53 (process block 108). The image source 63 may store the image data in a sequential order to be displayed at a future time. The image data, the pipeline configuration, and the presentation time may be stored at the same location in the external memory 53, or, as in some embodiments, in different locations in the external memory 53. After storage into external memory 53, the DMA block 64 of the display pipeline 52 may retrieve the presentation time and a pointer indicating the location in memory where the pipeline configuration is stored.

Figure 8:
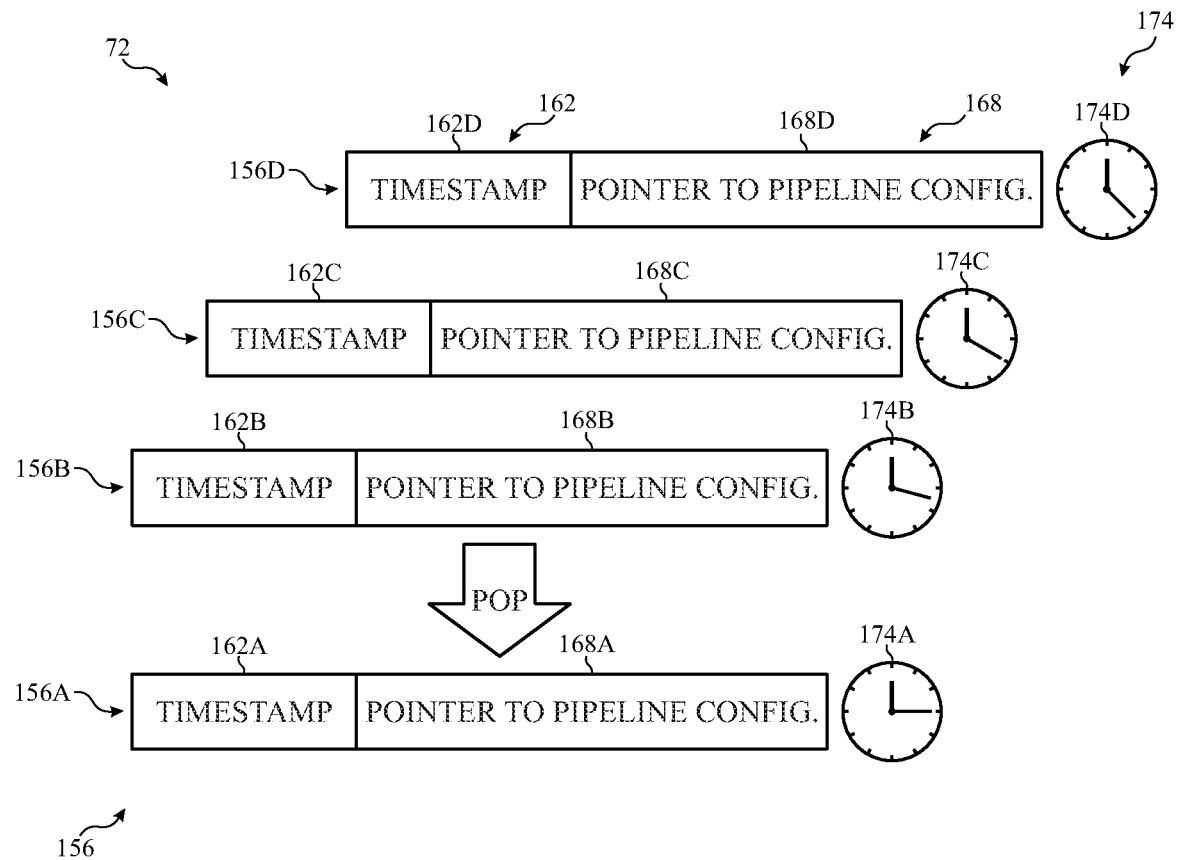
FIG. 8 is a diagrammatic representation of a time stamp queue corresponding with image frames to be displayed on the electronic display of FIG. 1, in accordance with an embodiment.

To help illustrate, an example of a time stamp queue 72 having one or more entries 156 (e.g., entry 156A, entry 156B, entry 156C, entry 156D) is shown in FIG. 8. As depicted, each entry 156 includes a time stamp 162 (e.g., time stamp 162A, time stamp 162B, time stamp 162C, time stamp 162D), and a pointer 168 (pointer 168A, pointer 168B, pointer 168C, pointer 168D). The entries 156 of the time stamp queue 72 each correspond to a different image frame 174. In other words, an image frame 174 may be associated with a time stamp 162, which indicates a target presentation time for the image frame 174, and a pointer 168, which indicates where pipeline configurations for processing image data corresponding with the image frame 174 are stored, for example, in an external memory 53.

A display pipeline 52 may "pop" respective entries 156 from the time stamp queue 72 for processing a sufficient time prior to the target presentation time indicated by the time stamp 162. In the depicted embodiment, entry 156A has been popped for processing by the display pipeline 52 at a sufficient time prior to the time stamp 162A. Upon being popped for processing, the display pipeline 52 may reference the pointer 168A, retrieve the corresponding pipeline configuration, for example, from an external memory 53, and use the retrieved pipeline configuration to prepare itself to process image data associated with the image frame 174A.

Returning to FIG. 7, after storing image data, pipeline configuration, and a presentation time in memory, the image source 63 may determine if the most recently stored image data corresponds to a last image of a flip-book (decision block 110). As a reminder, the image source 63 may pre-render one or more images for display at a future time as a flip-book. Thus, the image source 63 performs this check to determine if a most recently rendered image frame 174 is a last image frame 174 to be pre-rendered.

If the most recently rendered image frame 174 is not the last image frame 174 of the flip-book, the image source 63 may repeat the process 100 (process block 102). In this way, the image source 63 may continue to generate image data, pipeline configurations, and presentation times for each image (e.g., image frame 174) to be included in the flip-book.

When the most recently rendered image frame 174 is a last flip-book image, the image source 63 may continue to generate a pipeline power-on configuration (process block 112). In some embodiments, the pipeline power-on configuration may correspond to configuration data used to reconfigure (e.g., re-program) a display pipeline 52 after powering-on from a power-off state. For example, the pipeline power-on configuration may indicate where to fetch image data for display after power-on, processor interfacing commands, pipeline configuration to be applied to the display pipeline 52, clock and/or timing instructions, and the like. The image source 63 may generate code, instructions, settings, values, or any combination thereof for packaging and/or grouping as the pipeline power-on configuration.

Upon generating the pipeline power-on configuration, the image source 63 may store the pipeline power-on configuration in external memory 53 (process block 114). In some embodiments, the image source 63 may store the pipeline power-on configuration at the same memory location as the image data, the presentation time, the pipeline configuration, or any combination thereof. Additionally or alternatively, the image source 63 may store the pipeline power-on configuration at a different location in memory.

After completing the flip-book, the image source 63 may indicate that flip-book mode is ready (process block 116). The image source 63 may indicate to a controller 55 that the process 100 is complete and that the flip-book is ready. The image source 63 may transmit an indication in the form of a bit, a flag, a signal, and the like to other components in the electronic device 10, such as the controller 55. In some embodiments, the controller 55 and/or the display pipeline 52 may perform an action in response to receiving the indication. For example, the controller 55 may power-off the image source 63 and/or the display pipeline 52 to decrease power consumption by an electronic device 10.

Returning to FIG. 6, in preparing to display an image frame 174, in some embodiments, the display pipeline 52 may access the time stamp queue 72, which includes one or more entries 156 generated by the image source 63 each associated with image data stored in external memory 53. The display pipeline 52 may pop a first entry 156 of the time stamp queue 72 at a configuration time based on a time stamp (e.g., time stamp 162A) and may reference the popped entry (e.g., entry 156A) to determine a storage location of pipeline configuration for the current image to be displayed (e.g., image frame 174A). The display pipeline 52 may use the target presentation time of the next entry 156 to determine a configuration time for the next image frame 174, and upon a current time reaching the configuration time for the next image frame 174, the display pipeline 52 determines the location of the pipeline configurations and retrieves a pipeline configuration based on the pointer 168 from external memory 53 associated with the image frame 174 at the configuration time. The display pipeline 52 may use the DMA block 64 to retrieve the pipeline configurations from memory and may apply the pipeline configurations to itself via the configuration buffer 66.

Furthermore, after popping the time stamp queue 72, the display pipeline 52 may reference the time stamp 162 (e.g., time stamp 162B) to determine a next target presentation time corresponding to a next image frame 174 (e.g., image frame 174B) for display. The display pipeline 52 may read the subsequent entry 156 (e.g., entry 156B) time stamp 162 (e.g., time stamp 162B) after popping the current entry 156 (e.g., entry 156A). In addition, the display pipeline 52 may determine a configuration time associated with the image frame 174 (e.g., image frame 174B) based on the image frame's 174 target presentation time. The configuration time equals at least a processing duration and a configuration duration before the target presentation time because the configuration time is the time when the display pipeline 52 begins retrieval and loading of the pipeline configurations. Thus, after popping the time stamp queue 72, the display pipeline 52 may determine a next configuration time for a next image frame 174 to be displayed such that at that next configuration time, the display pipeline 52 pops the corresponding entry 156 and retrieve the corresponding pipeline configurations from the external memory 53.

After applying corresponding pipeline configurations for processing of a next image frame 174, the display pipeline 52 may process and complete preparations associated with displaying the image frame 174 prior to the time stamp 162. The display pipeline 52 may use an image data processing block 56 to prepare the image data for transmission to the display driver 54. Upon completion of processing, the display pipeline 52 may transmit the image data to the display driver 54 to enable display of the corresponding image frame 174 on the electronic display 12.

Based at least in part on image data transmitted by the display pipeline 52, the display driver 54 may generate and supply analog electrical signals to display pixels of the electronic display 12 to display an image frame 174. Furthermore, the display driver 54 may refresh the electronic display 12 according to various, predetermined refresh frequencies (e.g., 60 Hz, 50 Hz, 40 Hz, 30 Hz, 20 Hz, 10 Hz) to reduce an appearance of visual artifacts on the electronic display 12.

In some instances, an electronic device 10 may include one or more processing pipelines (e.g., a display pipeline 52). To facilitate communication therebetween, the one or more processing pipelines may include a DMA block 64. As described above, the DMA block 64 may read (e.g., retrieve) image data from the external memory 53 and/or write (e.g., store) image data to the external memory 53. Additionally or alternatively, the DMA block 64 may retrieve pipeline configurations to program (e.g., configure) registers in the display pipeline 52 from the external memory 53 based on the pointers 168, for example, into a configuration buffer 66 (e.g., a shadow FIFO) to program registers in the display pipeline 52 before processing of the image data. After processing using a pipeline configuration, in some embodiments, the display pipeline 52 may store image data in an output buffer 68 before outputting the image data to the display driver 54.

In some embodiments, image data retrieved from the external memory 53 may be processed in the image data processing block 56 to improve a perceived image quality when the image data is used to display a corresponding image. For example, the image data processing blocks 56 may include a color management block that converts image data from a source space to a display space of the electronic display 12. Additionally or alternatively, the image data processing blocks 56 may include a pixel contrast control block that applies tone maps to the image data to control perceived contrast based at least in part on environmental conditions, such as ambient light. Furthermore, the image data processing blocks 56 may include a fetch block 70 that uses the DMA block 64 to retrieve image data for processing. Additionally or alternatively, the display pipeline 52 may use the DMA block 64 to retrieve pipeline configurations from external memory 53, for example, based on pointers 168 popped from the time stamp queue 72.

The image processing system 50, using the components described, may operate in one of four operational modes. A first operational mode may be a normal mode, where the image source 63 works with the display pipeline 52 to render and process image frames 174 for display. A second operational mode may be a power-gating mode, where the controller 55 acts to power-gate the display pipeline 52 when idle, for example, in between processing of image data. A third operational mode may be a flip-book mode, where the image source 63 pre-renders a flip-book and is powered-off once pre-rendering is complete, providing a reduction in power consumption. A fourth operational mode may be a flip-book power-off mode, where after the image source 63 pre-renders the flip-book and once the display pipeline 52 is idle, while the image source 63 is powered-off, the controller 55 powers-off the display pipeline 52, or the image data processing blocks 56, until time to begin processing a new image for display. However, while the image processing system 50 may operate in a variety of operational modes, the display pipeline 52 processes image data in a similar manner, for example, regardless of the operational mode.

Figure 9:
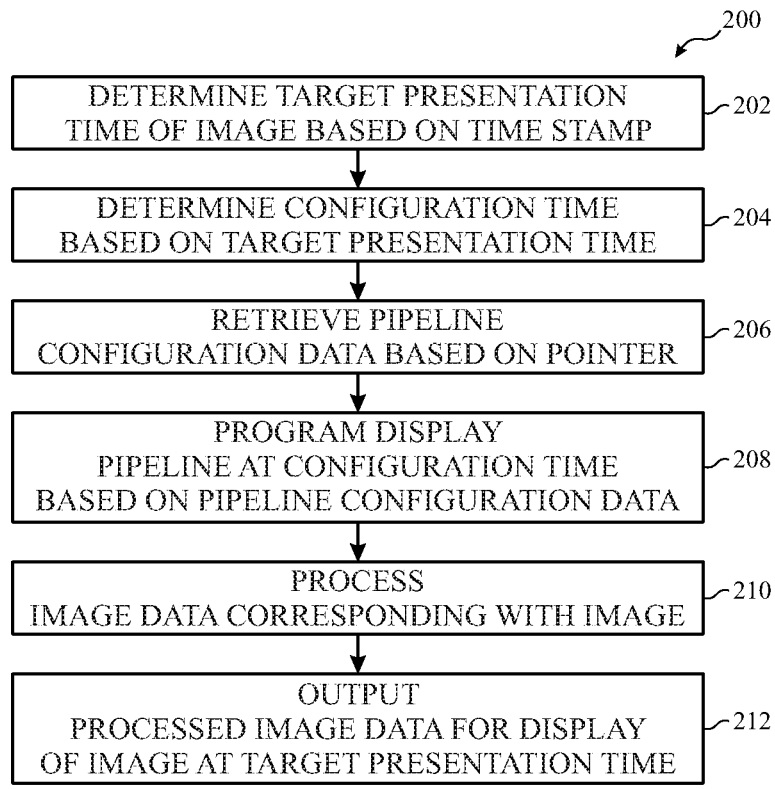
FIG. 9 is a flow diagram of a process for operating the display pipeline of FIG. 6, in accordance with an embodiment.

To help illustrate, an example of a process 200 for controlling operation of a display pipeline 52 is described in FIG. 9. Generally the process 200 includes determining a target presentation time of an image based on a time stamp (process block 202), determining configuration time based on the target presentation time (process block 204), retrieving pipeline configuration data based on a pointer (process block 206), programming display pipeline at a configuration time based on pipeline configuration data (process block 208), processing image data of the image (process block 210), and outputting processed image data for display of the image at the target presentation time (process block 212). In some embodiments, the process 200 may be implemented at least in part by executing instructions stored in a tangible, non-transitory, computer-readable medium, such as external memory 53, using processing circuitry, such as the display pipeline 52 and/or a controller 55. Additionally or alternatively, the process 200 may be implemented at least in part based on circuit connections formed in an electronic device 10.

Thus, in some embodiments, the display pipeline 52 may determine a target presentation time of an image frame 174 based on a time stamp (process block 202). The display pipeline 52 may pop the time stamp queue 72 to gain access to a next entry corresponding to a next image to be displayed. For example, the display pipeline 52 pops the time stamp queue 72 to access entry 156A corresponding to the next image frame 174A. Upon popping, the display pipeline 52 may have access to data of the entry 156A, such as the time stamp 162A. The time stamp 162 corresponds to the target presentation time of the image frame 174.

After determining the target presentation time, the display pipeline 52 may determine a configuration (programming) time based on the target presentation time (process block 204). The configuration time may represent a time to begin configuring the display pipeline 52 to prepare for processing of image data. To determine the configuration time, the display pipeline 52 may subtract a time duration from the target presentation time. The time duration may correspond to a set duration of time used to program a display pipeline 52, to process image data for display, and to transmit image data for display, such that beginning all these activities at the configuration time permits display at the target presentation time.

Additionally, the display pipeline 52 may retrieve pipeline configuration data based on the pointer 168 (process block 206). As previously described, the pipeline configuration data may be stored by the image source 63 in external memory 53. Additionally, a pointer 168 may indicate where the pipeline configuration data is stored in external memory 53. Thus, the display pipeline 52 may use the DMA block 64 to retrieve pipeline configuration data stored in external memory 53 as indicated by the pointer 168.

Upon retrieving pipeline configuration data, the display pipeline 52 may program itself with the pipeline configuration data at the pipeline configuration time (process block 208). Upon retrieval of pipeline configuration data, the DMA block 64 may transmit the pipeline configuration data to the configuration buffer 66, where the pipeline configuration data is used to adjust settings of the display pipeline 52 to prepare to process new image data, for example, by adjusting register values corresponding to the settings. The transmission of the pipeline configuration data to the configuration buffer 66 may occur at the configuration time.

After programming, the display pipeline 52 may process image data corresponding to a new image for display (process block 210). To process the image data, the display pipeline 52 may retrieve the image data from the external memory 53 via instructions issued to the fetch block 70. Upon retrieval from the external memory 53, the display pipeline 52 may process image data according to newly applied configurations, for example, to facilitate improving perceived image quality through the processing. For example, the display pipeline 52 may process image data to make the final image display brighter to compensate for environmental changes.

Upon completion of the processing of image data, the display pipeline 52 may output the processed image data for display of the new image at the target presentation time (process block 212). After processing image data, the display pipeline 52 transmits the processed image data to the display driver 54 for output to the electronic display 12. The display driver 54 may prepare the image data for display by, for example, converting the image data into one or more electrical signals that cause the electronic display 12 to display the new image. In this way, the display pipeline 52 operates to display images over time.

Figure 10:
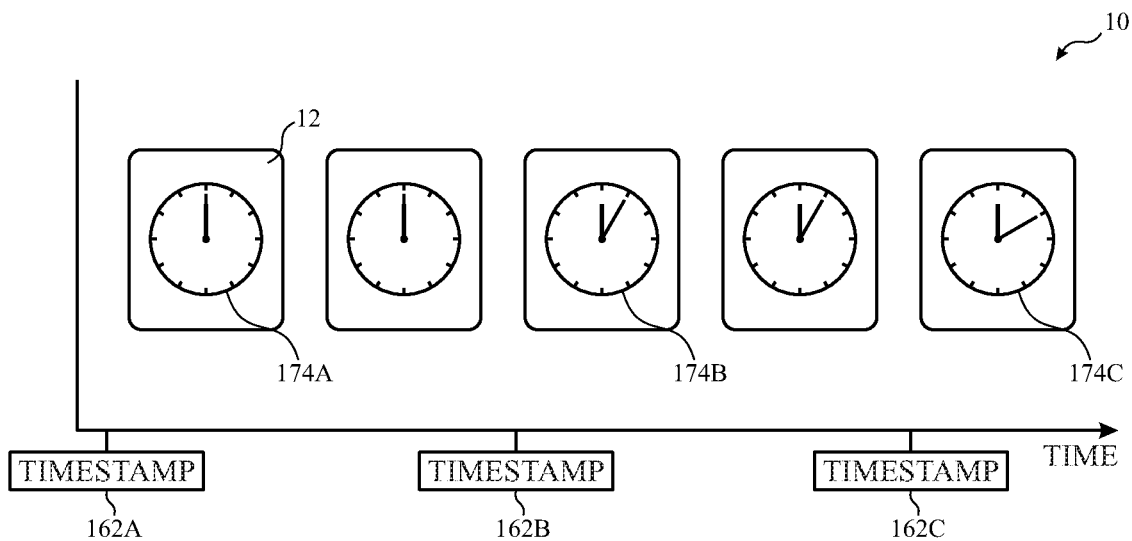
FIG. 10 is an example of the electronic device of FIG. 5 displaying image frames based on the time stamp queue of FIG. 8, in accordance with an embodiment.

To help illustrate, an example an electronic display 12 of an electronic device 10 displaying image frames 174 over time on an electronic display 12, is shown in FIG. 10. The electronic device 10, as depicted, may be operating in a normal mode, a power-gating mode, or a flip-book mode without a viewer of the electronic display 12 recognizing the difference (e.g., based on perceived quality of image frames 174 displayed). Generally, the electronic device 10 at the presentation time indicated by the time stamp 162A updates to display image frame 174A through a display pipeline 52 processing image data of the image frame 174A for display. At a configuration time prior to time stamp 162B, the display pipeline 52 processes image data corresponding to the image frame 174B for display and displays the image frame 174B at the presentation time indicated by time stamp 162B. The process 200 repeats, as described above, at a configuration time occurring before time stamp 162C, the display pipeline 52 processes image data corresponding to the image frame 174C for display at the presentation time indicated by the time stamp 162C. It is noted that a period of time between the time stamp 162A and the time stamp 162B may be longer or shorter than a period of time between the time stamp 162B and the time stamp 162C.

If the electronic device 10 is operating in the normal mode, no power-gating or powering-off of the display pipeline 52 or the image source 63 may occur. However, if the electronic device 10 is operating in the power-gating mode, the controller 55 may operate to power-gate the display pipeline 52 while idle in-between processing of image data for the image frame 174A or image frame 174B and retrieving the next pipeline configuration data to process new image data.

Additionally or alternatively, if the electronic device 10 is operating in the flip-book mode, the image source 63 may generate a flip-book corresponding to pre-rendered images. Upon the image source 63 completing the flip-book, the controller 55 may operate to power-off the image source 63. While in a flip-book power-off mode, the controller 55 may power-off or further reduce power supplied to the display pipeline 52 while idle, for example, between of processing of flip-book images for display and while the image source 63 is powered-off. It is noted that the controller 55 may power-off the image source 63 at any suitable time, such as immediately after the image source 63 indicates the flip-book is ready or a period of time after the image source 63 indicates the flip-book is ready, such as in the case if other asynchronous events prevent the image source 63 from being powered-off. In this way, the image source 63 may even be powered-off after the display pipeline 52 begins processing of the flip-book (e.g., image source 63 is powered-off during flip-book processing). Because of this, the image source 63 may be powered-off during the display of any suitable frame of the flip-book, as long as timing and signaling constraints are met, for example, the image source 63 being powered-on with enough time to process the next flip-book.

Figure 11:
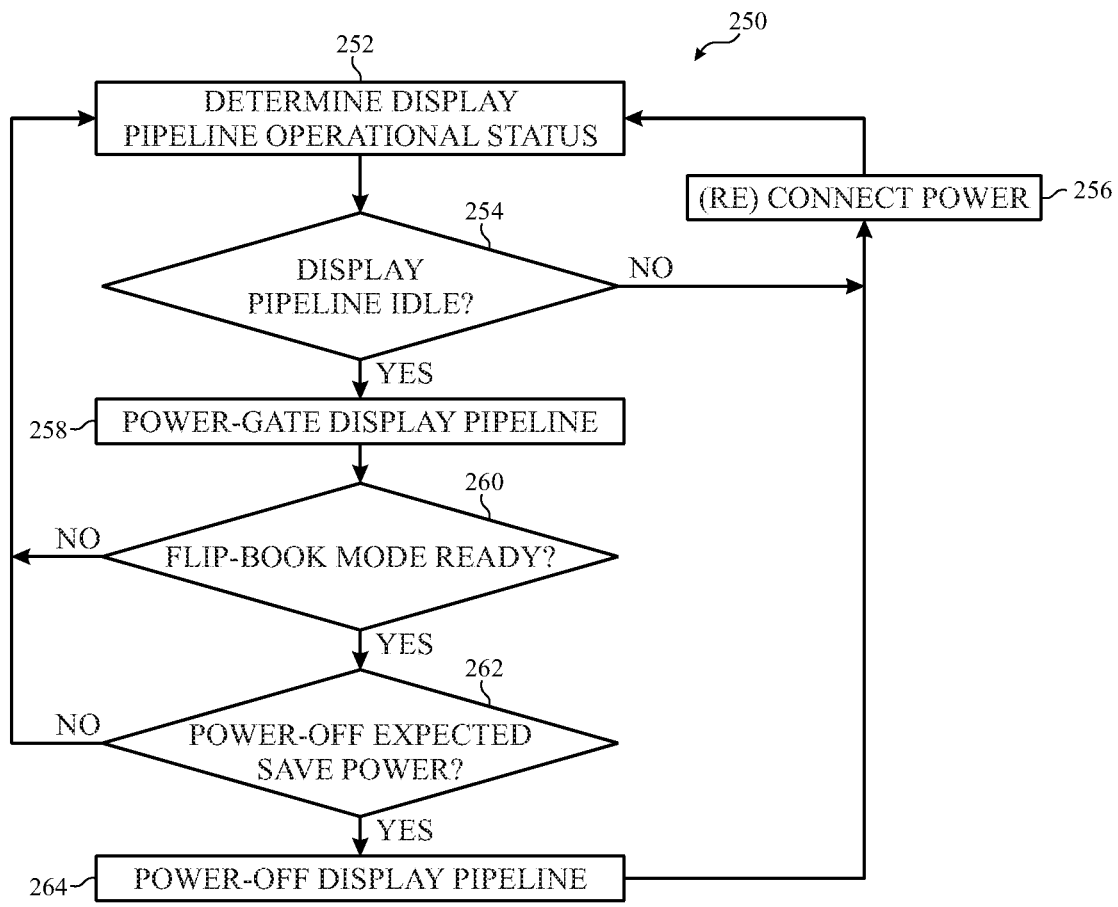
FIG. 11 is a flow diagram of a process for controlling power supplied to the display pipeline of FIG. 6, in accordance with an embodiment.

To help explain, a process 250 for determining whether to reduce power supplied to a display pipeline 52 is shown in FIG. 11. Generally, the process 250 includes determining a display pipeline operational status (process block 252), determining if the display pipeline is idle (decision block 254), and in response to the display pipeline not being idle (process block 256), continuing to connect power to the display pipeline. However, in response to the display pipeline being idle, power-gating the display pipeline (process block 258), determining if a flip-book mode is ready (decision block 260), and in response to the flip-book mode not being ready, continuing the determine the display pipeline operational status (process block 252). However, in response to the flip-book mode being ready, determining if powering-off the display pipeline saves power (decision block 262). In response to powering-off not saving power, continuing to determine the display pipeline operational status (process block 252), however, in response to powering-off saving power, powering-off the display pipeline (process block 264), and reconnecting power to the display pipeline (process block 256). In some embodiments, the process 250 may be implemented by executing instructions stored in a tangible, non-transitory, computer-readable medium, such as controller memory 62, using processing circuitry, such as the controller 55 and/or the controller processor 60. Additionally or alternatively, the process 250 may be implemented at least in part based on circuit connections formed in an electronic device 10.

Thus, in some embodiments, the controller 55 may determine display pipeline 52 operational status (process block 252). The display pipeline 52 may have one or more operational statuses transmitted to the controller 55. An example operational status is whether the display pipeline 52 is idle, or, in other words, is not currently popping the time stamp queue 72, is not currently retrieving data (e.g., configuration data, image data), is not currently processing image data, is not currently outputting image data to the display driver 54, or the like. The display pipeline 52, in some embodiments, transmits signals communicating its operational status, for example, a signal indicating when the display pipeline 52 is idle. Thus, the controller 55 may receive the signals indicative of an operational status to determine the display pipeline's 52 operational status.

Based on the operational status of the display pipeline 52, the controller 55 may determine whether the display pipeline 52 is idle (decision block 254). As described above, the display pipeline 52 may transmit a signal in response to being idle, thus upon receipt of the signal, the controller 55 may know that the display pipeline 52 is idle. However, in some embodiments, other methods of communicating display pipeline 52 idleness may be used.

In response to the display pipeline 52 not being idle, the controller 55 may continue to connect power to the display pipeline 52 (process block 256). The controller 55 may continue to supply full power to the display pipeline 52 because the display pipeline 52 is in the middle of a task. If the controller were to change the power supplied to the display pipeline 52, the completion of the task may be delayed and/or the processing ability of the display pipeline 52 slowed.

However, in response to the display pipeline 52 being idle, the controller 55 may power-gate the display pipeline 52 (process block 258). In other words, the controller 55 may decrease an amount of power supplied to the display pipeline 52 and/or the image data processing blocks 56, for example, by powering-off or electrically disconnecting the image data processing block 56 from a power-source of the electronic device 10. By decreasing the amount of power supplied to the display pipeline 52 and power-gating the display pipeline 52, the controller 55 may decrease overall power consumption of the image processing system 50 and/or of the electronic device 10 without the electronic device entering flip-book mode.

Upon power-gating the display pipeline 52, the controller 55 may determine if the flip-book mode is ready (decision block 260). As was previously described, an image source 63 indicates when the flip-book mode is ready. In some embodiments, the controller 55 determines the flip-book mode is ready based on this ready signal. As a reminder, the flip-book mode may be ready based at least in part on a flip-book being prepared by the image source 63.

If the controller 55 determines the flip-book mode is not ready, the controller 55 may continue to determine the display pipeline 52 operational status (process block 252). The controller 55 proceeding to determine the display pipeline 52 operational status enables the controller 55 to evaluate if the display pipeline 52 is idle. The process 250 may repeat as previously described.

However, if the controller 55 determines the flip-book mode is ready, the controller 55 may determine if powering-off the display pipeline 52 saves power (decision block 262). The controller 55 may determine based on a power-off duration if the display pipeline 52 is going to be powered-off long enough to justify the power-off. In other words, powering-off the display pipeline 52 has power costs associated with the power-off, for example, a cost of power to reconfigure the display pipeline 52 upon powering-on. To balance the costs of powering-off, the controller 55 may determine if powering-off the display pipeline 52 is expected to save power. The controller 55 may determine if powering-off the display pipeline 52 is expected to save power in a variety of manners, for example, through comparing a duration of a power-off to a threshold equal to a minimum time duration a display pipeline 52 is to be powered-off to save power.

Figure 12:
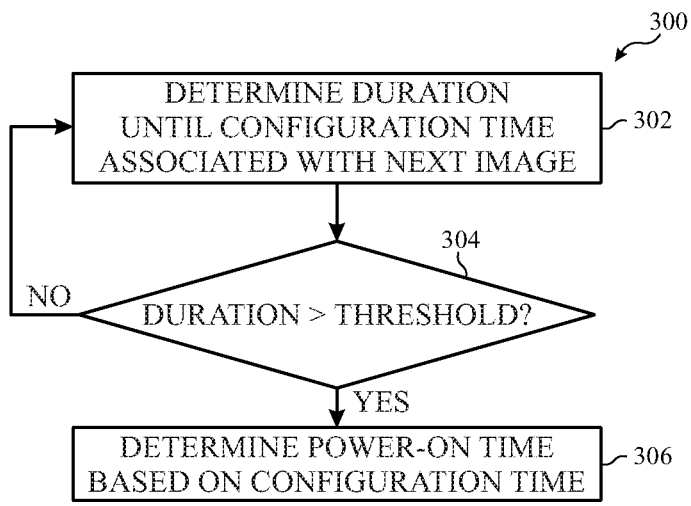
FIG. 12 is a flow diagram of a process for determining whether powering-off the display pipeline of FIG. 6 saves power, in accordance with an embodiment.

To help illustrate, an example of a process 300 for determining whether powering-off a display pipeline 52 saves power is shown in FIG. 12. Generally, the process 300 includes determining a duration until a configuration time associated with a next image (process block 302), determining if the duration exceeds a threshold (decision block 304), in response to the duration exceeding the threshold, determining the power-on time based on the configuration time (process block 306), and in response to the duration not exceeding the threshold, determining a duration until a configuration time associated with a next image (process block 302). In some embodiments, the process 300 may be implemented by executing instructions stored in a tangible, non-transitory, computer-readable medium, such as controller memory 62, using processing circuitry, such as the controller 55, the controller processor 60, or other circuitry of the display pipeline 52 (e.g., the display pipeline 52 may monitor the duration to determine whether powering-off saves power). Additionally or alternatively, the process 300 may be implemented at least in part based on circuit connections formed in an electronic device 10.

Thus, in some embodiments, the controller 55 may determine a duration until a configuration time associated with a next image (process block 302). As previously described, a display pipeline 52 may reconfigure itself at a configuration time before the next presentation time of the next image to prepare to process image data of the next image to be displayed. The controller 55 may determine a current time. After determining the current time, the controller 55 may use the current time to determine the time duration until the configuration time associated with the next image to be displayed.

Upon determining the current time, the controller 55 may determine if the duration exceeds a threshold (decision block 304). The threshold may be a predetermined value retrieved from the controller memory 62, for example, equal to a minimum time duration a display pipeline 52 is to be powered-off to save power. Thus, comparing the duration to the threshold enables the controller 55 to determine if power-savings are expected to occur due to powering-off the display pipeline 52.

If the duration does not exceed the threshold, the controller 55 may continue to determine the duration until a configuration time associated with the next image to be displayed (process block 302). The controller 55 may receive a next presentation time from the display pipeline 52 for the next image to be displayed after the display pipeline 52 pops the time stamp queue 72 and reads a time stamp 162 from an entry 156. Based on the presentation time, the controller 55 may determine the configuration time by counting back from the presentation time a predetermined time duration. Based on the configuration time for a next presentation time, the controller 55 may continue to determine a duration until the configuration time associated with a next image.

If the duration does exceed the threshold, the controller 55 may determine a power-on time based at least in part on the configuration time (process block 306). The time duration between a power-on time and a configuration time represents a length of time used to reconfigure the display pipeline 52 upon powering-on from a powered-off state. In this way, the power-on time occurs at least a processing duration and a configuration duration before the target presentation time. In some embodiments, the power-on time occurs at or before the second configuration time, represented by the processing duration and the configuration duration before the target presentation time. The reconfiguration of the display pipeline 52 may include loading an initial pipeline configuration, retrieving entries 156 for the time stamp queue 72 from before the power-off, and the like. Upon powering-off the display pipeline 52, the controller 55 may reconnect full power to the display pipeline 52 at the power-on time, as is described below.

Returning to process 250 of FIG. 11, in response to determining that the power-off is not expected to save power, the controller 55 may continue to determine the display pipeline operational status (process block 252). The controller 55 may repeat the process 250 as previously described. On the other hand, if the power-off is expected to save power, the controller 55 may proceed to power-off the display pipeline 52 (process block 264). In some embodiments, the controller 55 may electrically decouple the display pipeline 52 from a power source 26, for example, by changing a state of a switch. When the controller 55 powers-off the display pipeline 52, an amount of power consumed by the image processing system 50 and/or the electronic device 10 is reduced. As a reminder, these power reductions are further increased because the image source 63 is also powered-off, for example, because the flip-book is pre-rendered.

After powering-off the display pipeline 52, the controller 55 may subsequently reconnect full power to the display pipeline 52 (process block 256). In some embodiments, the controller 55 may reconnect full power by electrically coupling a power source 26 to the display pipeline 52, for example, through operating a switch to complete the electrical connection. In some embodiments, the controller 55 returns full power to the display pipeline 52 at a power-on time previously determined by the controller 55. The controller 55 may monitor a current time to determine when to power-on the display pipeline 52, for example, when the current time is equal to the power-on time.

Thus, in some embodiments, the process 250 may be repeated by a controller 55 to determine when to power-gate a display pipeline 52 and when to further reduce power supplied to the a display pipeline 52 (e.g., by powering-off or further decreasing an amount of power supplied). For example, the controller 55 may power-gate the display pipeline 52 blocks 56 after the display pipeline 52 completes processing and is idle. The controller 55 may power-off the display pipeline 52 upon the flip-book mode being ready and when the display pipeline 52 is idle. The controller 55 may permit the image source 63 to remain powered-off until the image source 63 is to be used to perform an action, such as to render new images for display.

In some embodiments, the image source 63 is powered-on in response to the currently displayed flip-book reaching an end, such that newly rendered images or a new flip-book is to be displayed. In addition, in some embodiments, the image source 63 is powered-on in response to an input to the image processing system 50 and/or the electronic device 10, such that images are to be actively rendered in response to user interaction with, for example, the electronic device 10. In some embodiments, the display pipeline 52 flushes expired time stamp queue 72 entries 156 in response to the image source 63 actively rendering images for display, that is, the display pipeline 52 discards irrelevant entries 156 and/or image data such that the previously queued images are not displayed and instead the new actively rendered images are displayed.

To help summarize effects of this disclosure, FIG. 13 is a diagrammatic representation generally depicting outputs from an always-on display 12 transitioning into and out of a flip-book power-off mode. As depicted, during a period from time 320 to time 322 of a particular display operation, the display 12 may have an active screen. That is, the display 12 may actively present images generated by the image source 63 and at this time, the image source 63 is not powered-off. Once the corresponding electronic device 10 is inactive for a predetermined period of time, or a user is not actively interacting with the device (e.g., using device in such a way to receive immediate feedback), the display 12 may have an inactive screen, or may display images that are not rendered in response to inputs into the electronic device 10. As depicted, the display presents an inactive screen from the time 322 to a time 324, where from the time 322 to a time 326, the display 12 and corresponding processing components may perform preparatory activities to prepare displaying the inactive screen (e.g., rendering a first image of a clock and preparing to display, thus transitioning to the inactive screen).

While the display 12 presents the inactive screen, conditions may be met to enter the flip-book power-off mode. As depicted, at a time 328, the display 12 and associated components begin to enter the flip-book power-off mode and at the time 324, the display 12 displays image frames from a flip-book previously prepared by an image source 63 of the display 12. From the time 324 to a time 330, this image source 63 may be powered-off and a display pipeline 52 may be selectively operated in a reduced-power state (e.g., powered-off, power-gated) based on the presentation constraints associated with each queued frame of the flip-book. In this way, this example transition into the flip-book power-off mode occurs not at a first queued frame of the depicted flip-book but rather at one or more subsequent frames from the first queued frame. This is permitted because a flip-book may include several buffer images at the beginning and end of the flip-book to facilitate the transition into the flip-book power-off mode. At the time 330, the image source 63 may be operated to power-on in anticipation of the flip-book ending (as represented by the end of line 332) to either render a new flip-book or begin preparations for active rendering of image frames.

From the time 330 to a time 334, the display 12 and the associated components continue transitioning from displaying the flip-book to displaying actively generated inactive frames. At a time 336 before the transition is complete, a confirmation may be transmitted to indicate that the cut-over from displaying the flip-book to displaying actively generated inactive frames is complete and at the time 334 displaying of the flip-book stops. From the time 334 to a time 338, the display 12 presents a same or similar inactive screen as the inactive screen from the time 326 to the time 324 and begins preparations to transition to actively rendered frames at the time 338. This change may be prompted by an external input to the electronic device 10 from a user or other input signal, by a timer indicating a predetermined interval has been met to exit from presenting an inactive screen, in response to a notification from a software application on the electronic device 10, or the like. Once preparations are complete at time 340, the display 12 presents an active screen that presents images generated actively and in response to activity and/or actions performed to the electronic device 10 (e.g., a user browsing the internet receives visual feedback from the electronic device 10 via changing images actively rendered and displayed in response to the inputs during the time 340 to time 342). Although the timeline is depicted as ending at the time 342, it should be understood that this displaying process may be continued for as long as suitable.

It should be noted that a display pipeline 52 may begin displaying a flip-book at any frame. In this way, a flip-book may have one or more additional frames included at the beginning and/or end of the flip-book and the display pipeline 52 may operate to display the flip-book when expedient based on other processing operations simultaneously occurring, for example, certain asynchronous events may not permit operation in the flip-book power-off mode.

In addition, it should be understood that a variety of suitable processing and/or controlling circuitry and/or combinations of circuitry may perform one or more of the functions described herein. For example, instead of the display pipeline 52 subtracting a time duration from the target presentation time to determine the configuration time, the image source 63 or the controller 55 may subtract a time duration from the target presentation time to determine the configuration time and may transmit the determined configuration time to the display pipeline 52. Thus, in this way, either the image source 63 or the controller 55 may output target presentation times and an idle indication or signal (e.g., upon completion of processing of image data corresponding to a previous image frame) to the other of the image source 63 or the controller 55. As such, the other of the image source 63 or the controller 55 may determine a current time, determine a duration between the current time and the transmitted target presentation time, and in response to the duration being greater than a duration threshold, determine the power-on time based at least in part on the transmitted target presentation time and a configuration time, facilitate powering-off or power-gating the display pipeline, and facilitate powering-on (e.g., returning full power, exiting the reduced power state) the display pipeline when the power-on time is reached.

Thus, the technical effects of the present disclosure include facilitating improved power consumption of an electronic device, for example, by improving a technique of managing power supplied to a display pipeline. These techniques describe selectively power-gating, powering-on, and powering-off a display pipeline to lower an amount of power consumed by the electronic device. These techniques additionally describe a flip-book mode that enables a controller to operate the display pipeline in a reduced-power state (e.g., powered-off, power-gated) while idle between displaying of flip-book image frames. While in the flip-book mode, an image source may be powered-off, permitting further power consumption reductions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   a display panel configured to display images based on corresponding image data;
   an image source configured to:
      provide a flip-book comprising a first image frame to be displayed at a first target presentation time and a second image frame to be displayed at a second target presentation time after the first target presentation time, and wherein the first target presentation time and the second target presentation time are specified before the first target presentation time is reached; and
      enter a power-gated mode in response to providing the flip-book, wherein the image source remains powered-gated while a plurality of image frames of the flip-book are presented;
   a display pipeline coupled between the image source and the display panel, wherein the display pipeline comprises:
   image data processing circuitry configured to process the image data to facilitate improving perceived image quality when the display panel uses the image data to display a corresponding image; and
   first control circuitry configured to:
      instruct the display pipeline to process first image data corresponding with the first image frame using the image data processing circuitry programmed with first configuration data associated with the first image frame;
      determine a first power-on time based at least in part on the second target presentation time of the second image frame while the image data processing circuitry processes the first image data corresponding with the first image frame; and
      instruct the display pipeline to power-gate the image data processing circuitry after the display pipeline completes processing of the first image data and until the first power-on time is reached.

2. The electronic device of claim 1, comprising external memory coupled between the image source and the display pipeline, wherein the image source is configured to:
   pre-render the first image frame in the flip-book at least in part by generating the first image data corresponding with the first image frame, generating the first configuration data associated with the first image frame, and storing the first image data and the first configuration data in the external memory;
   pre-render the second image frame in the flip-book at least in part by generating second image data corresponding with the second image frame, generating second configuration data associated with the second image frame, and storing the second image data and the second configuration data in the external memory; and
   power-off after the image source completes pre-rendering of the flip-book.

3. The electronic device of claim 2, wherein:
   the image source is configured to pre-render the first image frame at least in part by generating a first queue entry associated with the first image frame and storing the first queue entry in the external memory, wherein the first queue entry comprises a first time stamp that indicates the first target presentation time of the first image frame and a first pointer that indicates a storage location of the first configuration data associated with the first image frame in the external memory; and
   the image source is configured to pre-render the second image frame at least in part by generating a second queue entry associated with the second image frame and storing the second queue entry in the external memory, wherein the second queue entry comprises a second time stamp that indicates the second target presentation time of the second image frame and a second pointer that indicates a storage location of the second configuration data associated with the second image frame in the external memory.

4. The electronic device of claim 1, wherein the first control circuitry is configured to receive an idle indication from the image data processing circuitry after the image data processing circuitry completes processing of the first image data.

5. The electronic device of claim 1, wherein the display pipeline comprises a time stamp queue configured to store a first entry associated with the first image frame and a second entry associated with the second image frame, and wherein:
the first entry comprises a first time stamp that indicates the first target presentation time of the first image frame and a first pointer that identifies the first configuration data associated with the first image frame; and
the second entry comprises a second time stamp that indicates the second target presentation time of the second image frame and a second pointer that identifies second configuration data associated with the second image frame.

6. The electronic device of claim 5, wherein the first control circuitry is configured to:
pop the first entry associated with the first image frame from the time stamp queue when a first configuration time associated with the first image frame is reached;
read the second time stamp included in the second entry after the first entry is popped from the time stamp queue to determine the second target presentation time of the second image frame;
determine a second configuration time associated with the second image frame based at least in part on the second target presentation time of the second image frame; and
determine the first power-on time based at least in part on the second configuration time.

7. The electronic device of claim 6, wherein the first control circuitry is configured to:
determine the second configuration time associated with the second image frame such that the second configuration time occurs a processing duration of the display pipeline before the first target presentation time and that the second configuration time occurs a configuration duration of the display pipeline before the first target presentation time; and
determine the first power-on time such that the first power-on time occurs before the second configuration time.

8. The electronic device of claim 1, wherein the first control circuitry is configured to:
determine a first configuration time based at least in part on the first target presentation time of the first image frame;
instruct the display pipeline to program the image data processing circuitry by storing the first configuration data associated with the first image frame in programmable registers implemented in the image data processing circuitry when the first configuration time is reached;
determine a second configuration time based at least in part on the second target presentation time of the second image frame; and
instruct the display pipeline to program the image data processing circuitry by storing second configuration data associated with the second image frame in the programmable registers implemented in the image data processing circuitry when the second configuration time is reached.

9. The electronic device of claim 1, wherein the first control circuitry is configured to instruct the display pipeline to power-on the image data processing circuitry after the first power-on time is reached.

10. The electronic device of claim 9, comprising second control circuitry coupled to the display pipeline, wherein:
one of the first control circuitry or the second control circuitry is configured to:
output the second target presentation time to the other of the first control circuitry or the second control circuitry; and
output an idle indication to the other of the first control circuitry or the second control circuitry when the image data processing circuitry completes processing of the first image data corresponding with the first image frame; and
the other of the first control circuitry or the second control circuitry is configured to:
determine a current time;
determine duration between the current time and the second target presentation time; and
when the duration is greater than a duration threshold:
determine the first power-on time based at least in part on the second target presentation time and a configuration time;
instruct the electronic device to operate the display pipeline to enter a reduced-power state; and
instruct the electronic device to operate the display pipeline to exit the reduced-power state when the first power-on time is reached.

11. The electronic device of claim 1, wherein:
the flip-book comprises a third image frame to be displayed at a third target presentation time after the second target presentation time of the second image frame; and
the first control circuitry is configured to:
instruct the display pipeline to process second image data corresponding with the second image frame using the image data processing circuitry programmed with second configuration data associated with the second image frame;
determine a second power-on time based at least in part on the third target presentation time of the third image frame while the image data processing circuitry processes the second image data corresponding with second image frame; and
instruct the display pipeline to power-gate the image data processing circuitry after the display pipeline completes processing of the second image data and until the second power-on time is reached.

12. The electronic device of claim 1, comprising a power supply configured to output electrical power, wherein:
the display pipeline is configured to power-gate the image data processing circuitry by electrically disconnecting the power supply from the image data processing circuitry;
the display pipeline is configured to power-on the image data processing circuitry by electrically connecting the power supply to the image data processing circuitry;
the electronic device is configured to power-gate the display pipeline by electrically disconnecting the power supply from the image data processing circuitry; and the electronic device is configured to power-off the display pipeline by electrically disconnecting the power supply to the display pipeline.

13. The electronic device of claim 1, wherein the electronic device comprises a portable phone, a media player, a personal data organizer, a handheld game platform, a tablet device, a computer, or any combination thereof.

14. A tangible, non-transitory, computer-readable medium that stores instructions executable by one or more processors of an electronic device that, when executed by the one or more processors, cause the one or more processors to:
pre-render one or more image frames of a flip-book, wherein the one or more image frames of the flip-book are configured to be displayed at respective target presentation times;
store the one or more image frames of the flip-book in a memory;
prepare a pipeline configuration to be applied to a display pipeline at exit from an idle state; and
transmit an indication to a system controller after pre-rendering the flip-book, wherein the system controller is configured to operate the one or more processors into a reduced power mode in response to the indication, and wherein the one or more processors remain in the reduced power mode while the flip-book is presented.

15. The non-transitory computer-readable medium of claim 14, comprising instructions that cause the one or more processors to:
pre-render a first image frame in the flip-book of the one or more image frames by generating a first image data corresponding with the first image frame;
generate a first configuration data associated with the first image frame;
store the first image data and the first configuration data in the memory;
generate a time stamp queue entry comprising a pointer to indicate a storage location of the first configuration data and a time stamp to indicate a target presentation time of the first image frame; and
in response to the first image frame not being the last image frame of the flip-book, pre-render a second image frame in the flip-book of the one or more image frames by at least generating a second image data corresponding with the second image frame.

16. The non-transitory computer-readable medium of claim 14 comprising instructions that cause the one or more processors to:
in response to a first event, power-on to actively render an image frame for display; and
in response to a second event, power-on to pre-render a second flip-book.

17. A method for operating a display pipeline implemented in an electronic device, comprising:
determining, by a controller, a first target presentation time of a first image to be displayed;
determining, by the controller, a configuration time based on the first target presentation time;
programming, by the controller, the display pipeline at the configuration time;
processing, by the controller, a first image data corresponding to the first image to generate processed image data, wherein the first image data is generated before the configuration time by an image source configured to be power-gated after generation of a flip-book comprising the first image data and second image data;
reducing, by the controller, a supply power of the display pipeline at least partially in response to generating the processed image data, wherein the supply power is returned to a larger supply power before a second target presentation time corresponding to the second image data, and wherein the image source remains power-gated while the flip-book is presented; and
outputting, by the controller, the processed image data to cause display of the first image at the first target presentation time.

18. The method of claim 17, comprising:
reading the first target presentation time of the first image to be displayed from a first time stamp queue entry of a time stamp queue;
reading a pointer of the first time stamp queue entry indicating where pipeline configuration data corresponding to the first image to be displayed is saved in a memory; and
retrieving the pipeline configuration data based on the pointer.

19. The method of claim 18, comprising:
popping the time stamp queue to reveal a second time stamp queue entry corresponding to a second image to be displayed at the second target presentation time later than the first target presentation time;
enabling an idle signal configured to indicate that image data is not being processed;
indicating idle until processing of the second image data corresponding to the second image to be displayed begins; and
in response to beginning the processing of the second image data, disabling the idle signal.

20. The method of claim 17, comprising:
in response to completing processing of the first image data, outputting an idle signal to control circuitry disposed outside the display pipeline, wherein image data processing circuitry of the display pipeline is at least partially disconnected from the supply power by the control circuitry in response to the idle signal.

* * * * *